United States Patent
Gibbs

(10) Patent No.: US 9,315,154 B1
(45) Date of Patent: Apr. 19, 2016

(54) ADJUSTABLE REARVIEW MIRROR

(71) Applicant: Richard C. Gibbs, Los Angeles, CA (US)

(72) Inventor: Richard C. Gibbs, Los Angeles, CA (US)

(*) Notice: Subject to any disclaimer, the term of this patent is extended or adjusted under 35 U.S.C. 154(b) by 39 days.

(21) Appl. No.: 14/105,777

(22) Filed: Dec. 13, 2013

Related U.S. Application Data

(60) Provisional application No. 61/767,437, filed on Feb. 21, 2013.

(51) Int. Cl.
*B60R 1/04* (2006.01)
(52) U.S. Cl.
CPC .................................. *B60R 1/04* (2013.01)
(58) Field of Classification Search
CPC ...... G02B 26/0825; G02B 5/08; B60R 1/074; B60R 1/12; B60R 1/06; B60R 1/04
USPC ........... 359/838–850, 872; 248/476, 477, 479
See application file for complete search history.

(56) References Cited

U.S. PATENT DOCUMENTS

| | | | |
|---|---|---|---|
| 3,575,375 A | 4/1971 | Strem, Jr. | |
| 3,589,663 A | 6/1971 | Vance | |
| 3,625,599 A | 12/1971 | Poirier | |
| 4,802,751 A | 2/1989 | Ueng | |
| 4,957,265 A * | 9/1990 | Seitz | B60R 1/076 359/841 |
| 5,127,700 A | 7/1992 | Joe | |
| 5,487,522 A | 1/1996 | Hook | |
| 5,615,857 A | 4/1997 | Hook | |
| 6,672,726 B1 * | 1/2004 | Boddy | B60R 1/078 359/841 |
| 2007/0223120 A1 * | 9/2007 | Kuo | B60R 1/04 359/871 |
| 2012/0026616 A1 * | 2/2012 | Rawlings | B60R 1/04 359/876 |

* cited by examiner

*Primary Examiner* — Thomas K Pham
*Assistant Examiner* — Alberto Betancourt
(74) *Attorney, Agent, or Firm* — Neustel Law Offices; Jason L. Gilbert

(57) ABSTRACT

An adjustable rearview mirror which allows the rear view mirror to be adjusted out of the viewing field of the windshield area to improve the driver and passenger experience in the motor vehicle. The adjustable rearview mirror generally includes a central slot in which a mirror arm is pivotally secured. A pair of retainer rods may be selectively extended across and retracted from the central slot with a trigger. When the retainer rods are retracted from the central slot, the mirror arm may be freely adjusted into various positions. When the retainer rods are extended across the central slot, the mirror arm may be locked into a particular position. Thus, the rearview mirror may be withdrawn from view when it is not necessary so as to allow an unobstructed view of the area surrounding the vehicle.

20 Claims, 11 Drawing Sheets

ADJUSTABLE REARVIEW MIRROR

CROSS REFERENCE TO RELATED APPLICATIONS

I hereby claim benefit under Title 35, United States Code, Section 119(e) of U.S. provisional patent application Ser. No. 61/767,437 filed Feb. 21, 2013. The 61/767,437 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a vehicle mirror and more specifically it relates to an adjustable rearview mirror which allows the rear view mirror to be adjusted out of the viewing field of the windshield area to improve the driver and passenger experience in the motor vehicle.

2. Description of the Related Art

Any discussion of the related art throughout the specification should in no way be considered as an admission that such related art is widely known or forms part of common general knowledge in the field.

Rearview mirrors are required for use in all motor vehicles in most countries and thus are present in a substantial majority of motor vehicles throughout the world. The traditional rearview mirror is secured to the windshield of the vehicle adjacent to its upper end and extends downwardly to provide a mirrored view of what is behind the vehicle.

While rearview mirrors are generally adjustable in the sense that the mirror itself adjusts with respect to the mirror arm, rearview mirrors do not typically permit the mirror arm to be adjusted to remove the mirror from the field of view of those within the vehicle. This can be burdensome in situations such as when viewing a film at a drive-in theater or while parked on a particularly scenic location, such as one of the many scenic pull-offs located on roads throughout the world.

Because of the inherent problems with the related art, there is a need for a new and improved adjustable rearview mirror which allows the rear view mirror to be adjusted out of the viewing field of the windshield area to improve the driver and passenger experience in the motor vehicle.

BRIEF SUMMARY OF THE INVENTION

The invention generally relates to an adjustable rearview mirror which includes a housing adapted to be secured within a vehicle. The housing includes a central slot in which a mirror arm is pivotally secured. A pair of retainer rods may be selectively extended across and retracted from the central slot with a trigger. When the retainer rods are retracted from the central slot, the mirror arm may be freely adjusted into various positions. When the retainer rods are extended across the central slot, the mirror arm may be locked into a particular position. Thus, the rearview mirror may be withdrawn from view when it is not necessary so as to allow an unobstructed view of the area surrounding the vehicle.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
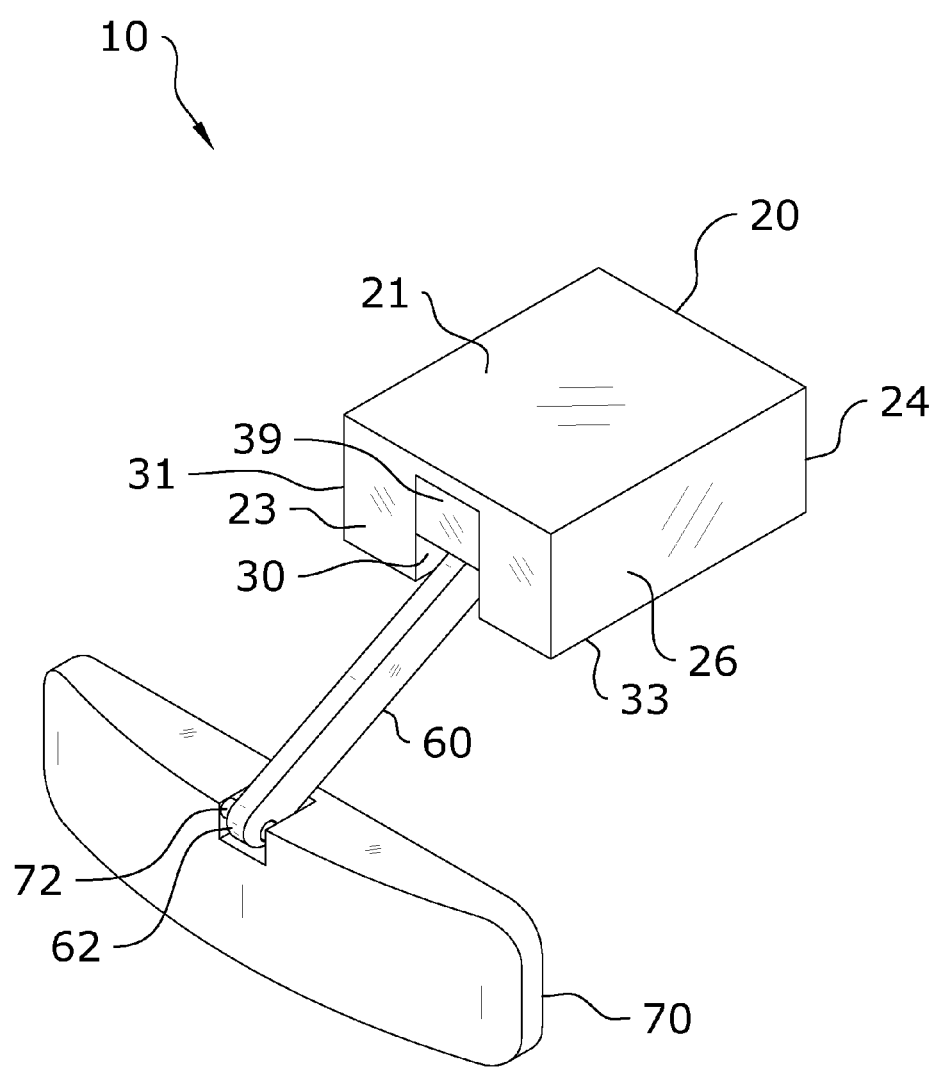
FIG. 1 is an upper perspective view of the present invention.

Turning now descriptively to the drawings, in which similar reference characters denote similar elements throughout the several views, FIGS. 1 through 11 illustrate an adjustable rearview mirror 10, which comprises a housing 20 adapted to be secured within a vehicle 12. The housing 20 includes a central slot 30 in which a mirror arm 60 is pivotally secured. A pair of retainer rods 36, 37 may be selectively extended across and refracted from the central slot 30 with a trigger 50. When the retainer rods 36, 37 are refracted from the central slot 30, the mirror arm 60 may be freely adjusted into various positions. When the retainer rods 36, 37 are extended across the central slot 30, the mirror arm 60 may be locked into a particular position. Thus, the rearview mirror 70 may be withdrawn from view when it is not necessary so as to allow an unobstructed view of the area surrounding the vehicle 12.

B. Housing

As shown throughout the figures, the present invention includes a housing 20 which is adapted to be secured within a vehicle 12. It should be noted at the outset that the present invention is adapted for use with a wide range of vehicles 12. The present invention may be utilized with any vehicle 12 which benefits from use of a rearview mirror. While the figures illustrate usage only with a car 12, the present invention may be utilized with vehicles 12 which include, without limitation, cars, trucks, SUV's, boats, airplanes, trains, golf carts, scooters, and the like.

The present invention is also adapted to be easy-to-install and may be secured to various locations within a vehicle 12 depending on its layout. The housing 20 may be comprised of a substantially rectangular shape as shown in the figures or may be comprised of various other shapes. The shape, size, and configuration of the housing 20 should not be construed as limited by the figures, which illustrate an exemplary embodiment.

Figure 2:
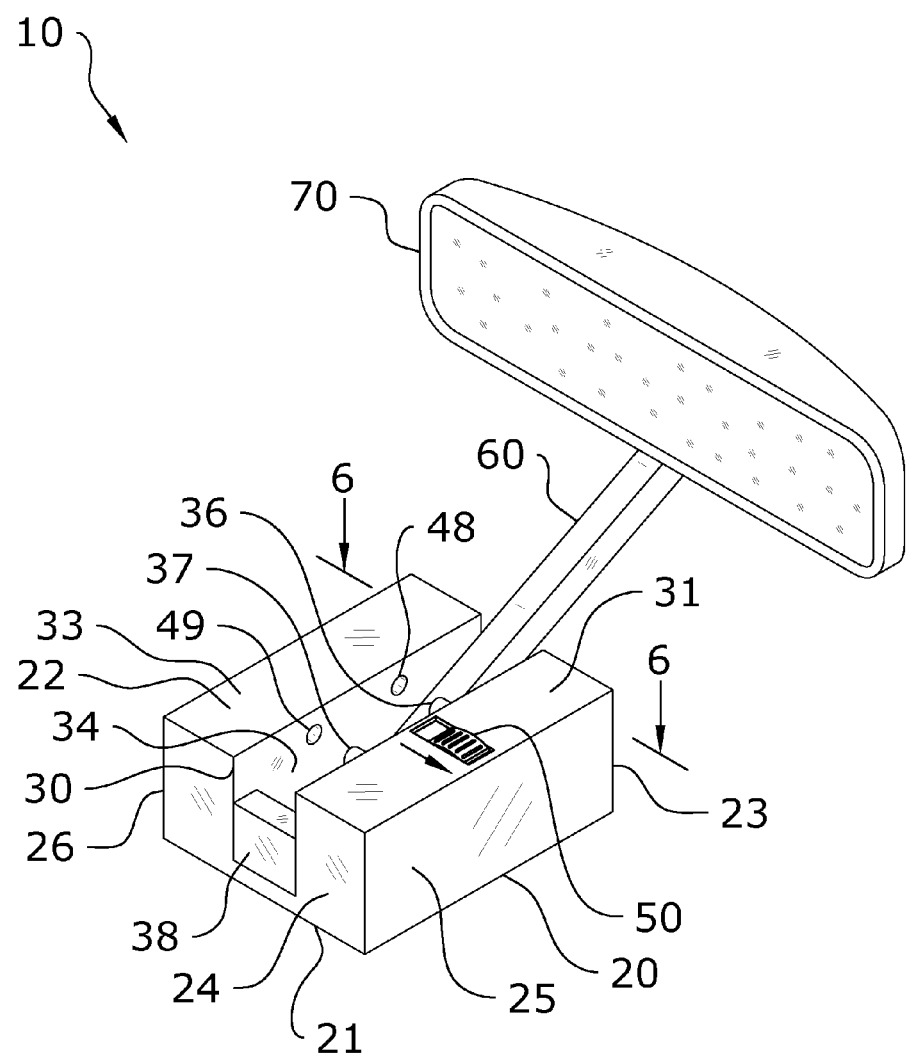
FIG. 2 is a lower perspective view of the present invention with the mirror arm in a first position.
Figure 10:
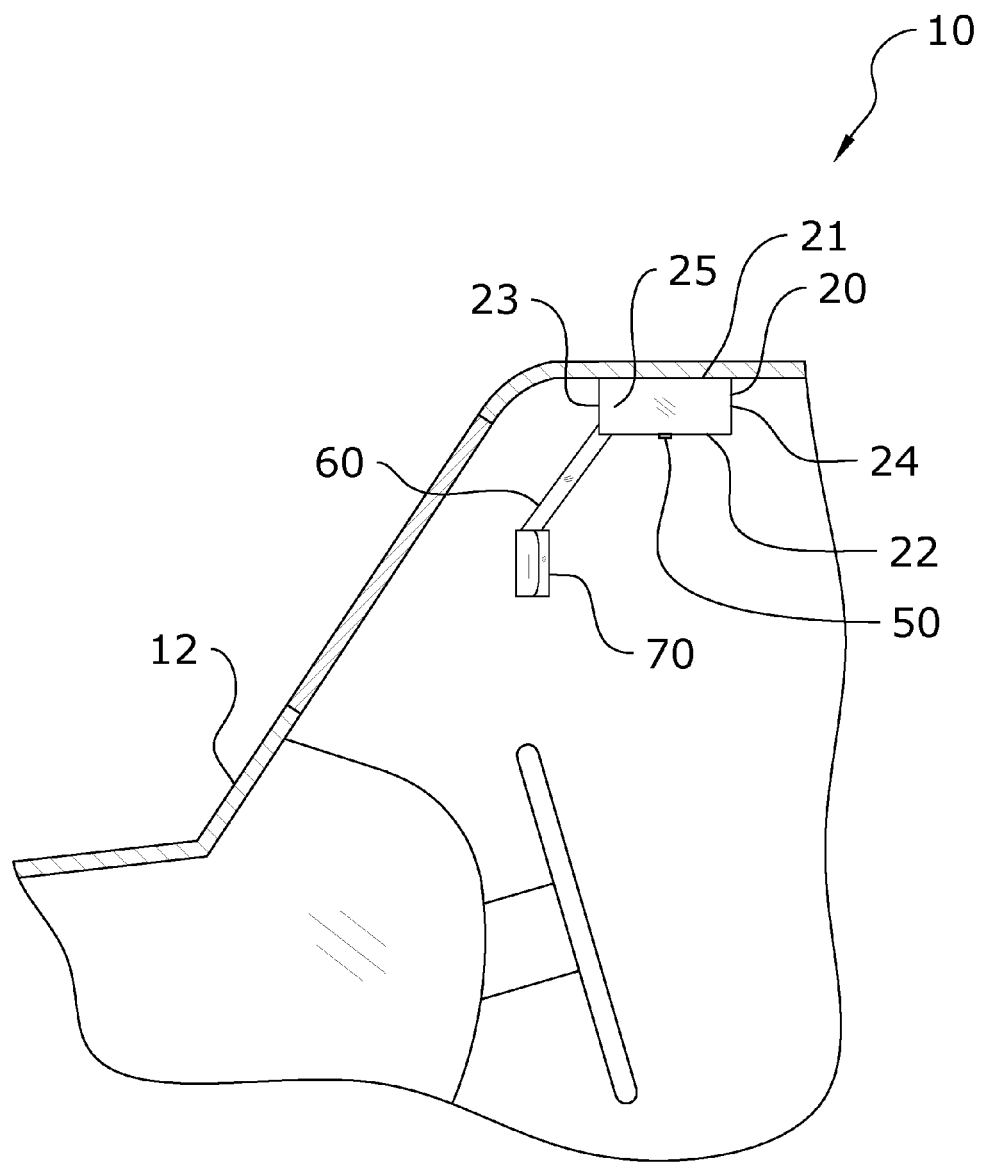
FIG. 10 is a side view of the present invention in a first position in a vehicle.
Figure 11:
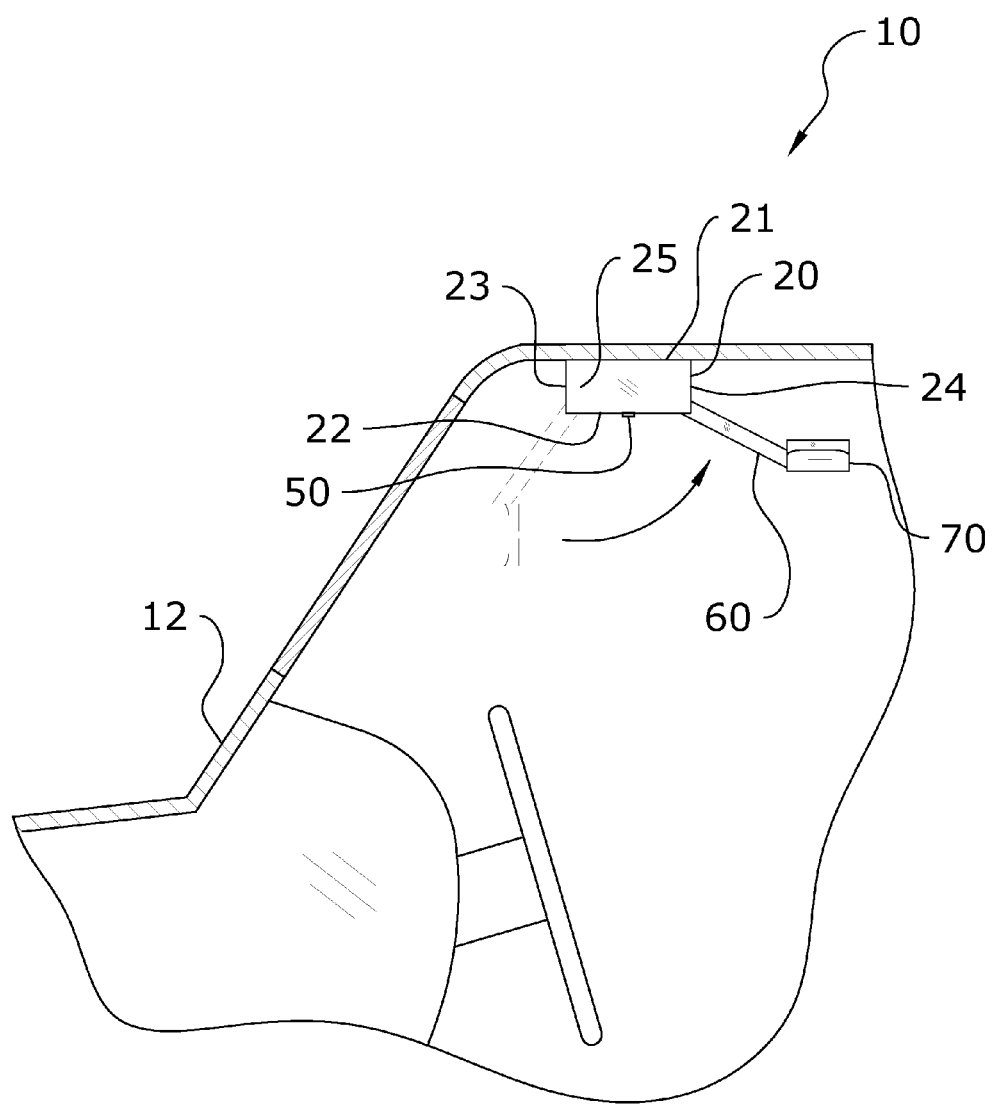
FIG. 11 is a side view of the present invention illustrating adjustment of the mirror arm.

As best shown in FIGS. 1 and 2, the housing 20 includes an upper end 21, a lower end 22, a front end 23, a rear end 24, a first side 25, and a second side 26. The upper end 21 of the housing 20 is generally secured, either removably or fixedly, to the vehicle 12, such as through connection to the inner roof of the vehicle 12 as shown in FIGS. 10 and 11. The housing 20 may be secured to the vehicle 12 throughout various methods, such as with an adhesive, welding, clamps, brackets, fasteners, and the like.

As best shown in FIG. 2, the lower end 22 of the housing 20 includes a central slot 30 in which the mirror arm 60 of the present invention is pivotally secured. The central slot 30 is preferably positioned equidistance between the first and second sides 25, 26 of the housing 20, though other configurations may be utilized. The central slot 30 divides the housing 20 into a first portion 31 adjacent to the first side 25 and a second portion 33 adjacent to the second side 26.

Figure 4:
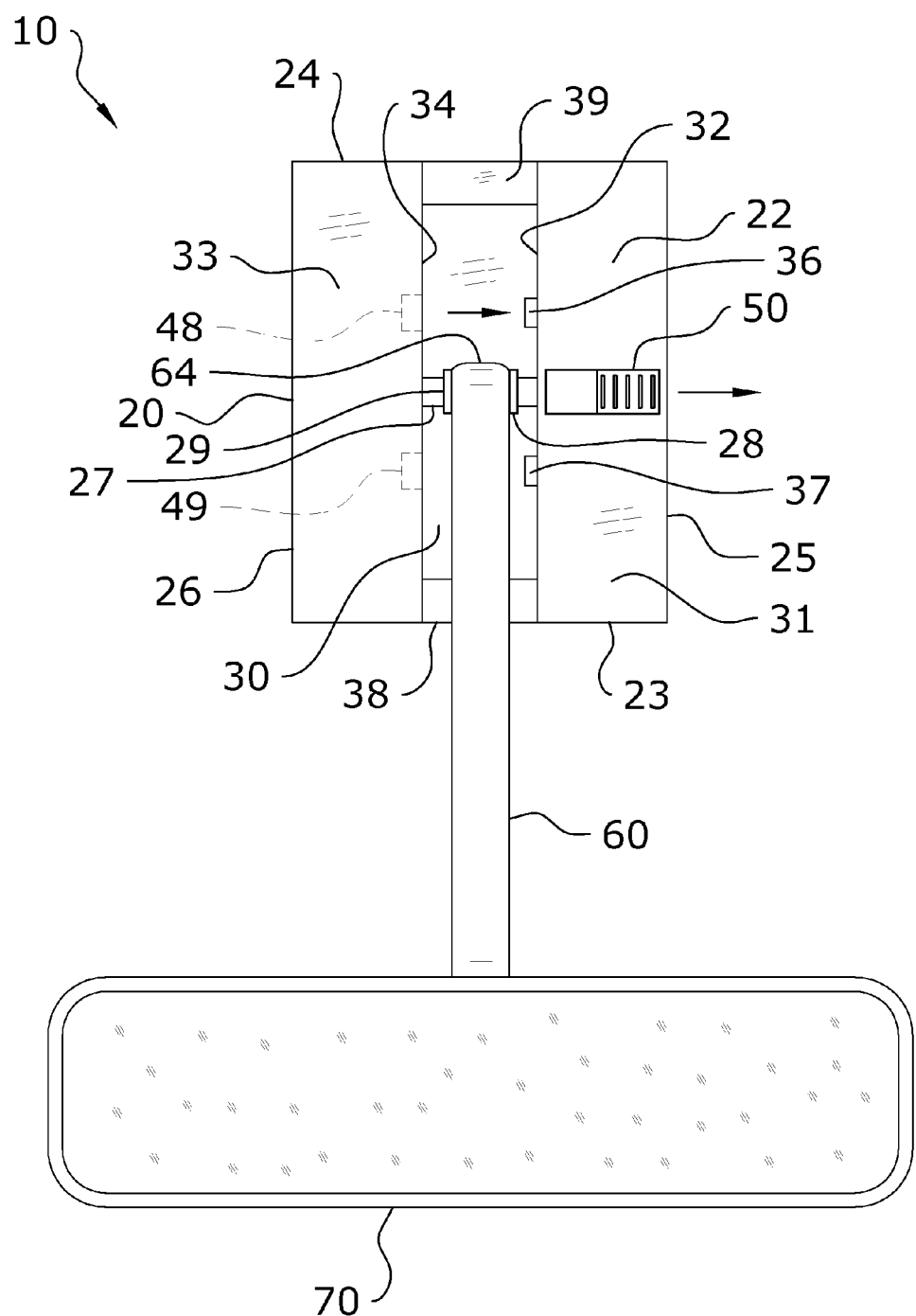
FIG. 4 is a bottom view of the present invention with the retaining rods in a retracted position and the mirror arm in the second position.
Figure 5:
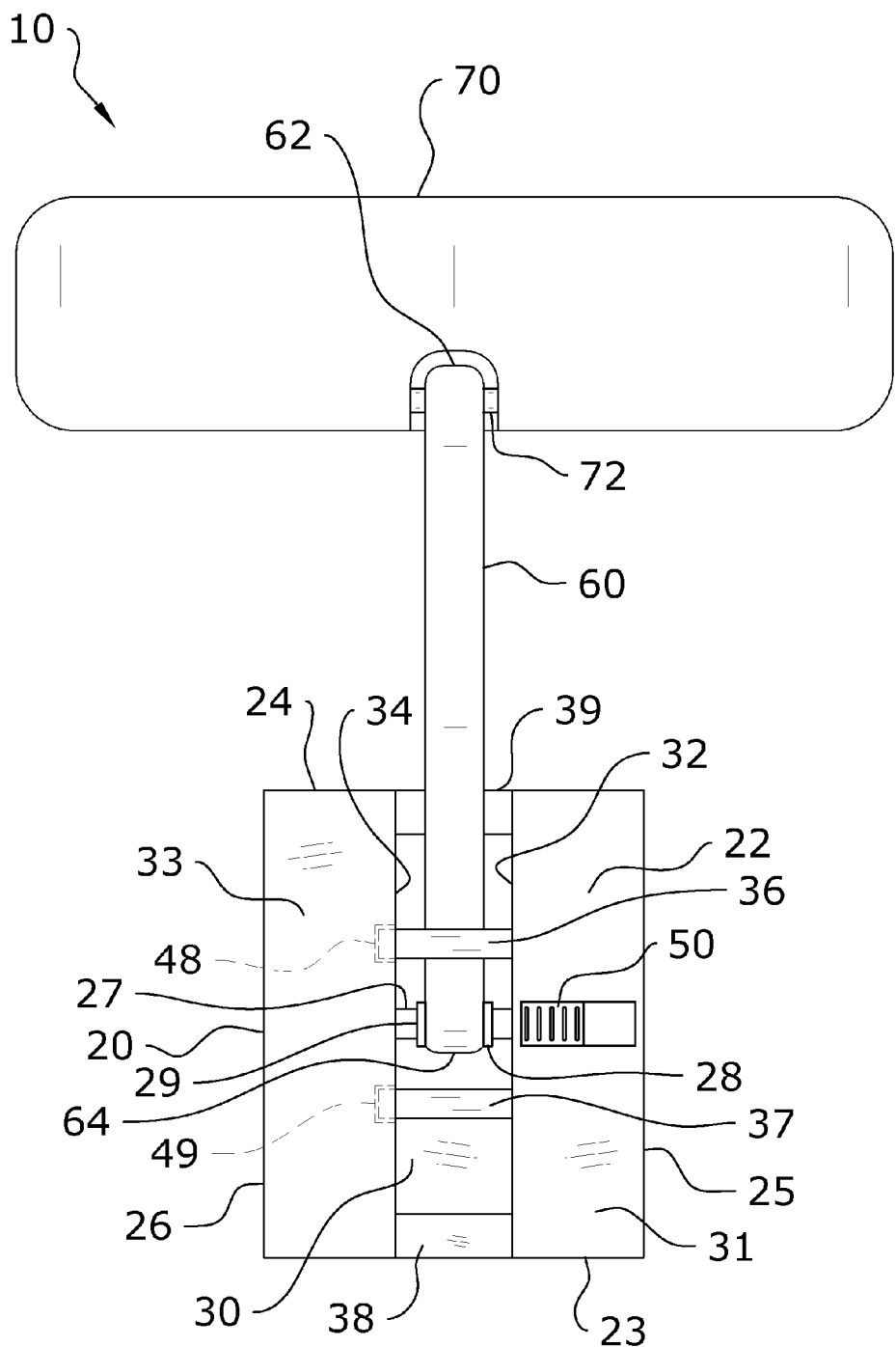
FIG. 5 is a bottom view of the present invention with the retaining rods in an extended position and the mirror arm in the first position.

As best shown in FIGS. 4 and 5, the first end of the central slot 30 may include a first stopper 38 and the second end of the central slot 30 may include a second stopper 39. The stoppers 38, 39 are comprised of a soft material such as rubber which extends across either end of the central slot 30 to stop and prevent damage to the mirror arm 60 when it comes into contact therewith.

As shown throughout the figures, the mirror arm 60 is pivotally secured within the central slot 30 so as to be adjusted between at least two positions. As best shown in FIGS. 4 and 5, an axle 27 extends between the first inner wall 32 of the first portion 31 and the second inner wall 34 of the second portion 33 of the housing 20. The first end 62 of the mirror arm 60 is pivotally secured to the axle 27 so as to be adapted to swing in both directions.

Figure 6:
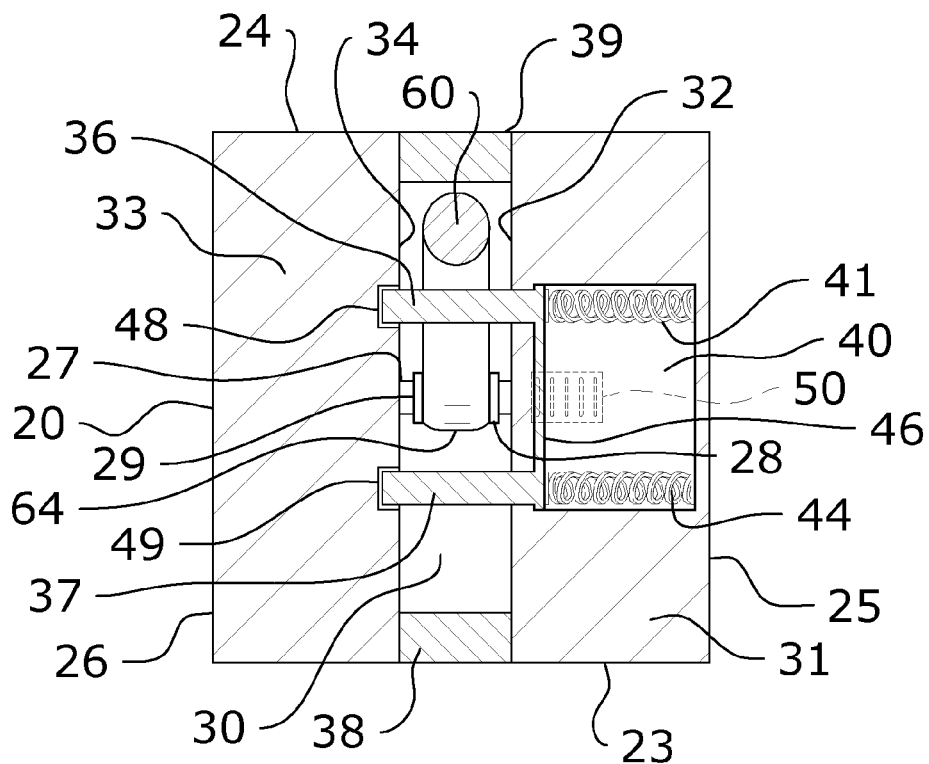
FIG. 6 is a sectional view of the present invention illustrating the retaining rods in an extended position.
Figure 7:
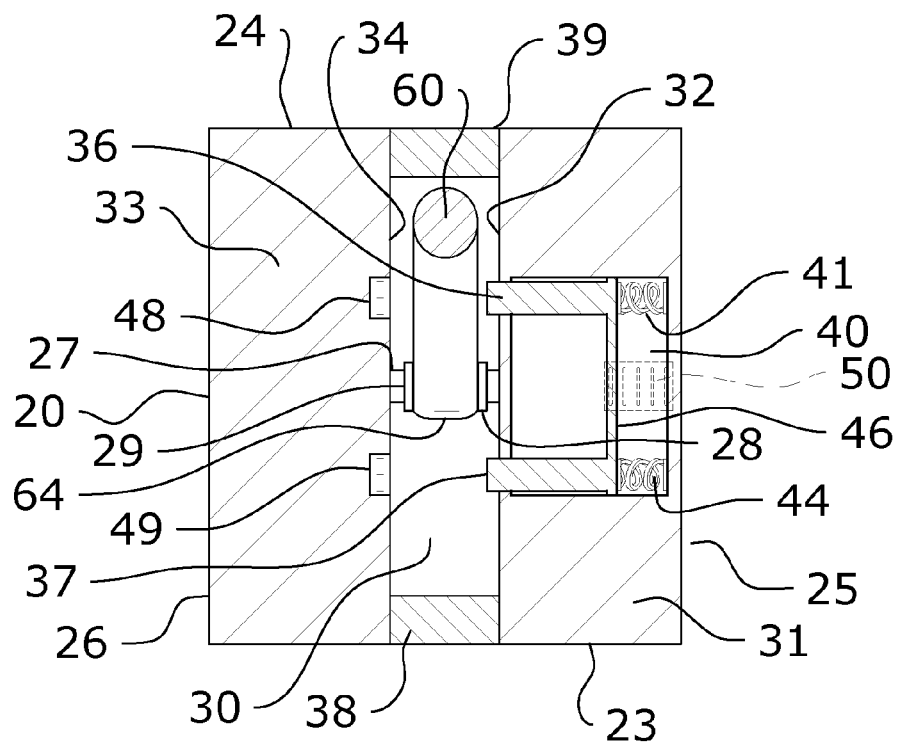
FIG. 7 is a sectional view of the present invention illustrating the retaining rods in a retracted position.

As best shown in FIGS. 6 and 7, a pair of centering members 28, 29 may be positioned on either side of the first end 62 of the mirror 60 where it is secured around the axle 27. The first centering member 28 is positioned adjacent to a first side of the first end 62 of the mirror arm 60 and the second centering member 29 is positioned adjacent to a second side of the first end 62 of the mirror arm 60 such that the first end 62 of the mirror arm 60 is sandwiched between the centering members 28, 29 as shown in the figures. This configurations keeps the mirror arm 60 centered on the axle 27. In a preferred embodiment, the centering members 28, 29 are each comprised of wheels or O-rings which encircle the axle 27 on either side of the location where the mirror arm 60 is pivotally secured thereto.

C. Retainer Rods

The mirror arm 60 may be selectively set into each of the positions by utilizing one or more retainer rods 36, 37 which may be selectively extended across the central slot 30 as shown in FIGS. 5 and 6 or retracted to free the central slot 30 as shown in FIGS. 4 and 7. When extended across the central slot 30, the retainer rods 36, 37 will retain the mirror arm 60 in its current position.

As best shown in FIGS. 6 and 7, the first portion 31 of the housing 20 includes an inner channel 40 extending into its first inner wall 32. A pair of bias members 41, 44 are positioned within the inner channel 40, with a first bias member 41 positioned adjacent to a first side of the inner channel 40 and the second bias member 44 positioned adjacent to a second side of the inner channel 40. The bias members 41, 44 are preferably comprised of springs which extend parallel with respect to each other in a spaced-apart relationship.

A linkage member 46 links the first and second bias members 41, 44 to each other. The linkage member 46 is preferably comprised of a bracket, rod, or other structure which extends between the distal ends of the bias members 41, 44. In some embodiments, a single bias member 41 may be utilized, while in other embodiments, more bias members 41, 44 may be utilized. The number of bias members 41, 44 should not be construed as limited by the exemplary figures.

The pair of retainer rods 36, 37 are adapted to be selectively extended across the central slot 30 or retracted therefrom. When extended across the central slot 30, the retainer rods 36, 37 will retain the mirror arm 60 in its current position. When refracted from the central slot 30, the mirror arm 60 will be adjustable between various positions.

As shown in FIGS. 6 and 7, the retainer rods 36, 37 each extend from the linkage member 46. Preferably, the first retainer rod 36 extends from a first end of the linkage member 46 directly across from the first bias member 41 and the second retainer rod 37 extends from a second end of the linkage member 46 directly across from the second bias member 44.

When the linkage member 46 is drawn backwards, the linkage member 46 and retainer rods 36, 37 will be pulled back into the inner channel 40 as shown in FIG. 7. When the linkage member 46 is released, the bias members 41, 44 will force the linkage member 46 back toward the central slot 30, thus forcing the retainer rods 36, 37 back across the central slot 30 as shown in FIG. 6.

A pair of receivers 48, 49, preferably comprised of openings adapted to receive a portion of the retainer rods 36, 37, extend into the second inner wall 34 of the second portion 33 directly across the central slot 30 from the retainer rods 36, 37. The distal end of the first retainer rod 36 will rest within the first receiver 48 and the distal end of the second retainer rod 37 will rest within the second receiver 49 when the rods 36, 37 are in their extended positions.

D. Trigger

Figure 3:
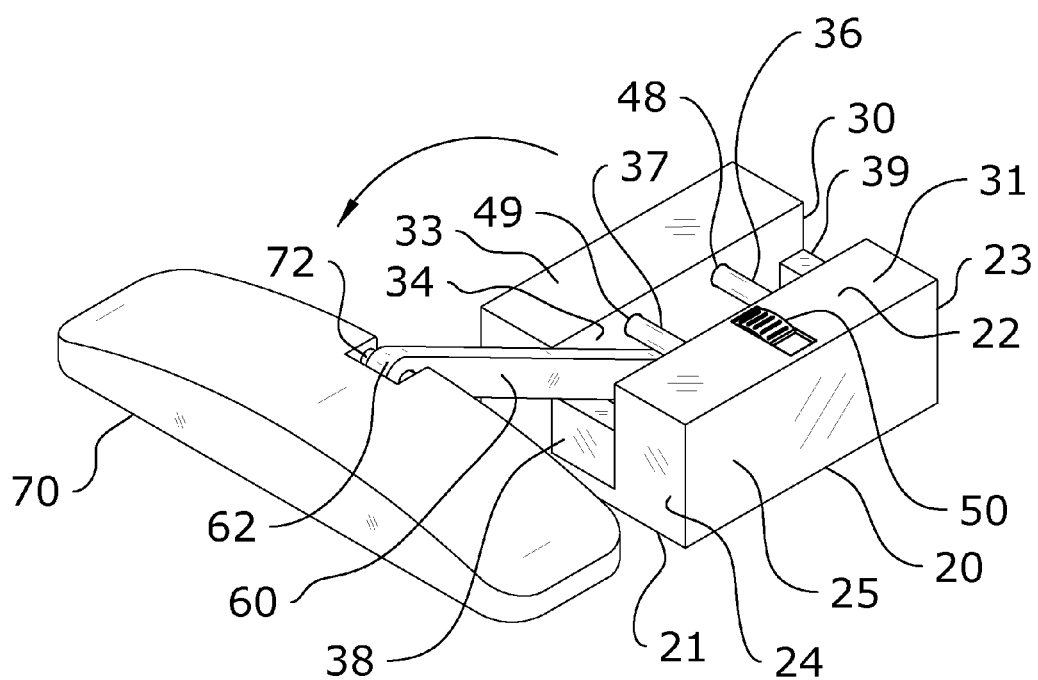
FIG. 3 is a lower perspective view of the present invention with the mirror arm in a second position.

A trigger 50 may be utilized to advance and retract the retainer rods 36, 37 as best shown in FIGS. 2 and 3. The trigger 50 may be positioned at various locations on the housing 20, but will preferably be located on its lower end 22 to allow easy access when the present invention is installed within a vehicle 12. The configuration of the trigger 50 may vary and should not be construed as being limited by the exemplary figures. In some cases, a button or lever may be utilized. The trigger 50 may function to lock/unlock the retainer rods 36, 37 mechanically, electrically, or a combination thereof.

The trigger 50 is preferably slidably secured to the housing 20 and fixedly secured to the linkage member 46. Thus, by advancing the trigger 50 in a first direction, the linkage member 46 and retainer rods 36, 37 will advance with the trigger 50. The trigger 50 is preferably biased forward by the bias members 41, 44.

When drawing back the trigger 50 as shown in FIG. 2, the linkage member 46 is drawn back into the inner channel 40, the retainer rods 36, 37 are retracted, and the bias members 41, 44 become biased. At this time, the mirror arm 60 may be adjusted. When the trigger 50 is let go as shown in FIG. 3, the linkage member 46 will return to its rested position, the retainer rods 36, 37 will extend across the central slot 30 with their distal ends positioned within the receivers 48, 49, and the bias members 41, 44 will be extended and unbiased.

E. Mirror

The configuration of the mirror arm 60 and mirror 70 may vary widely in different embodiments of the present invention. A conventional mirror 70 is shown pivotally secured to a second end 64 of a mirror 60 by a pivot pin 72. The first end 62 of the mirror arm 60 is pivotally secured to the axle 27 of the housing 20. Any type of mirror arm 60 and mirror 70 may be utilized with the present invention. The mirror 70 could be various shapes and sizes. The mirror arm 60 could be multiple pieces or one piece, and could be comprised of various shapes, sizes, and configurations.

F. Operation of Preferred Embodiment

Figure 8:
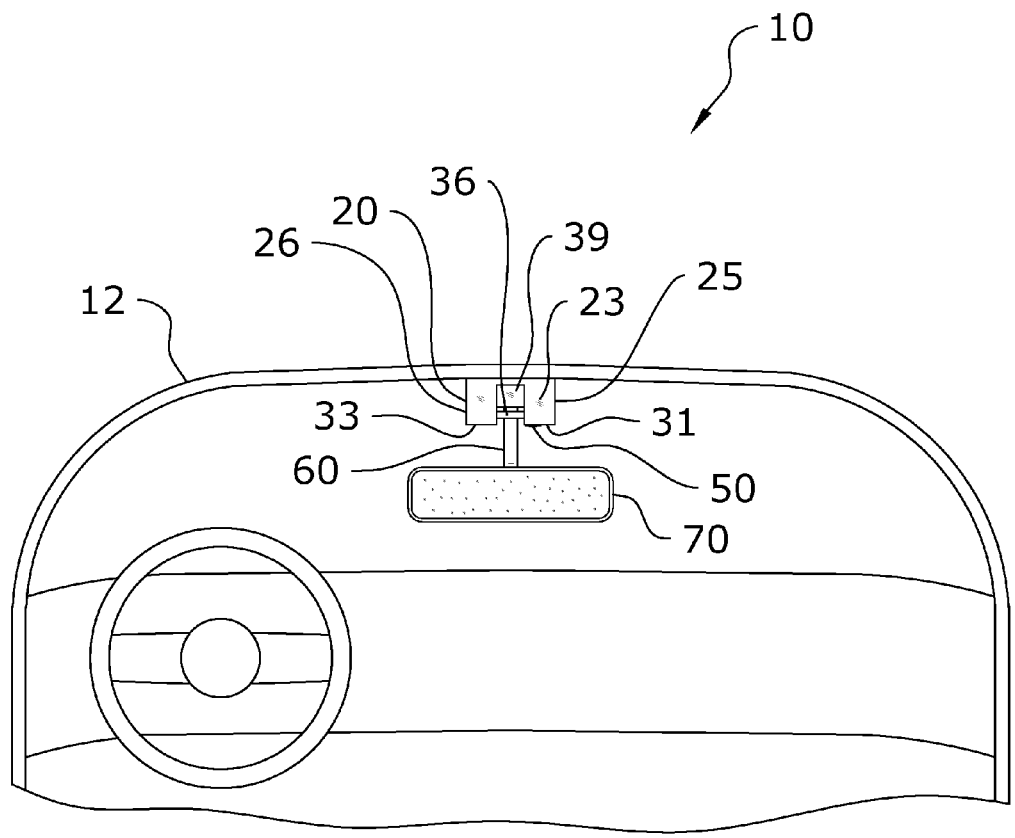
FIG. 8 is a frontal view of the present invention in a first position in a vehicle.
Figure 9:
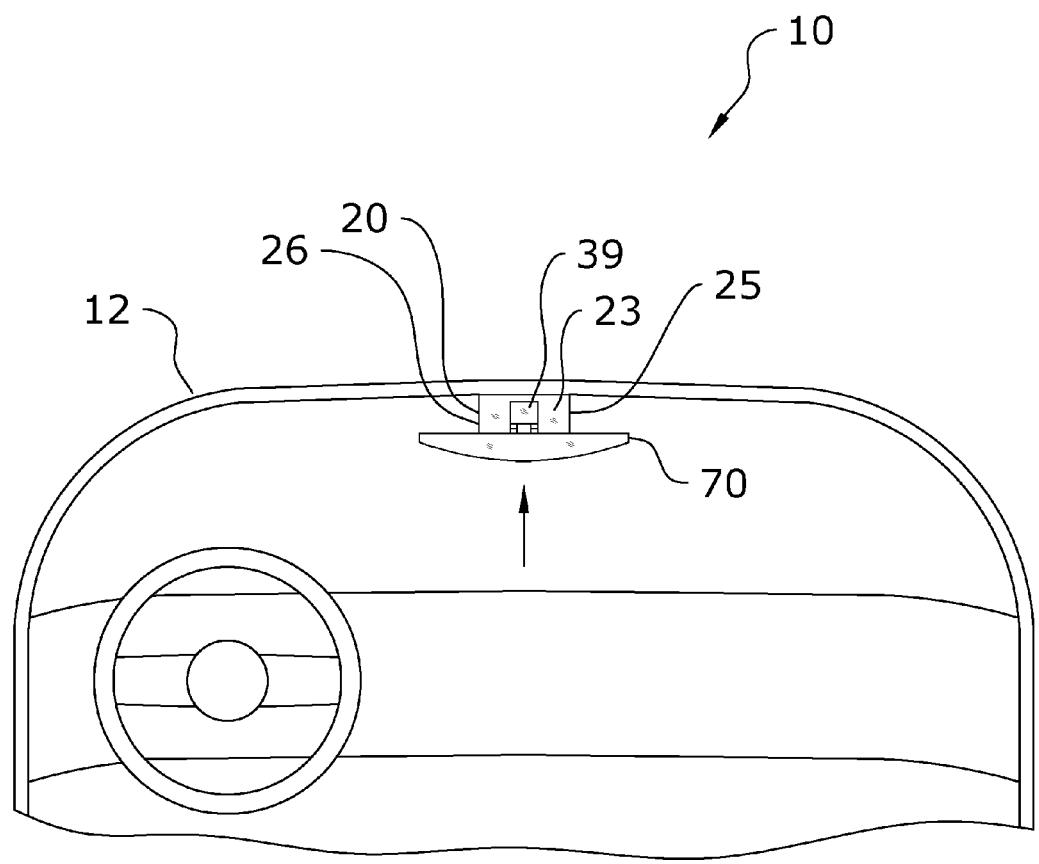
FIG. 9 is a frontal view of the present invention in a second position in a vehicle.

In use, the housing 20 is secured within the cabin of the vehicle 12. When driving, the mirror arm 60 will be extended downward into a first position to allow the mirror 70 to be within view as shown in FIGS. 8 and 10. When a more complete view is necessary, such as when parked in a scenic location, the mirror arm 60 may be pulled back to a second position as shown in FIGS. 9 and 11.

The trigger 50 is first drawn back, which draws back the linkage member 46 and retracts the retainer rods 36, 37 into the inner channel 40. With the central slot 30 free of obstruction, the mirror arm 60 may be freely adjusted. When the trigger 50 is released, the bias members 41, 44 will push the linkage member 46 back toward the central slot 30 and extend the retainer rods 36, 37 thereacross to lock the mirror arm 60 in place in the new position.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. An adjustable rearview mirror, comprising:
   a housing configured to be secured within a vehicle, wherein said housing includes an inner channel:
   a central slot formed within said housing;
   a mirror arm adjustably secured within said central slot;
   a mirror positioned at a distal end of said mirror arm; and
   at least one retainer rod configured to selectively extend across and retract from said central slot, wherein said at least one retainer rod is configured to be pulled back into said inner channel when said at least one retainer rod is retracted from said central slot, wherein said mirror arm is freely adjustable between a plurality of positions when said at least one retainer rod is retracted from said central slot, wherein said mirror arm is locked into one of said plurality of positions when said at least one retainer rod is extended across said central slot.

2. The adjustable rearview mirror of claim 1, further comprising a trigger for adjusting said at least one retainer rod.

3. The adjustable rearview mirror of claim 1, wherein said central slot extends across a lower end of said housing.

4. The adjustable rearview mirror of claim 1, wherein said central slot includes an axle, wherein a proximal end of said mirror arm is pivotally secured to said axle.

5. The adjustable rearview mirror of claim 4, further comprising a first centering member positioned around said axle adjacent to a first side of said mirror arm and a second centering member positioned around said axle adjacent to a second side of said mirror arm.

6. The adjustable rearview mirror of claim 5, wherein said first centering member and said second centering member are each comprised of O-rings.

7. The adjustable rearview mirror of claim 1, wherein said at least one retainer rod is comprised of a first retainer rod and a second retainer rod.

8. The adjustable rearview mirror of claim 7, further comprising a first bias member connected to said first retainer rod and a second bias member connected to said second retainer rod.

9. The adjustable rearview mirror of claim 8, further comprising a linkage member extending between said first retainer rod and said second retainer rod, wherein said first bias member is connected at a first end to said linkage member and at a second end to said housing.

10. The adjustable rearview mirror of claim 1, further comprising a first stopper positioned at a first end of said central slot and a second stopper positioned at a second end of said central slot.

11. An adjustable rearview mirror, comprising: a housing configured to be secured within a vehicle, wherein said housing includes an inner channel: a central slot formed within said housing, wherein said central slot divides said housing into a first portion and a second portion; an axle extending across said central slot between said first portion and said second portion; a first retainer rod, wherein said first retainer rod is configured to be pulled back into said inner channel when said first retainer rod is retracted from said central slot: a second retainer rod, wherein said first retainer rod and said second retainer rod are configured to selectively extend across and retract from said central slot, wherein said second retainer rod is configured to be pulled back into said inner channel when said second retainer rod is retracted from said central slot a mirror arm pivotally secured to said axle, wherein said mirror arm is freely adjustable between a plurality of positions when said at least one retainer rod is retracted from said central slot, wherein said mirror arm is locked into one of said plurality of positions when said at least one retainer rod is extended across said central slot; and a mirror secured to a distal end of said mirror arm.

12. The adjustable rearview mirror of claim 11, wherein said first portion of said housing includes an inner channel.

13. The adjustable rearview mirror of claim 12, further comprising a first bias member and a second bias member positioned within said inner channel.

14. The adjustable rearview mirror of claim 13, further comprising a linkage member extending between a distal end of said first bias member and a distal end of said second bias member.

15. The adjustable rearview mirror of claim 14, wherein said first retainer rod is secured to a first end of said linkage member and said second retainer rod is secured to as second end of said linkage member.

16. The adjustable rearview mirror of claim 15, further comprising a trigger connected to said linkage member, wherein said trigger extends out of said housing such that adjustment of said trigger moves said linkage member.

17. The adjustable rearview mirror of claim 15, wherein said first bias member and said second bias member are each comprised of springs.

18. The adjustable rearview mirror of claim 11, further comprising a first stopper positioned at a first end of said central slot and a second stopper positioned at a second end of said central slot.

19. The adjustable rearview mirror of claim 18, further comprising a first centering member positioned around said axle adjacent to a first side of said mirror arm and a second centering member positioned around said axle adjacent to a second side of said mirror arm.

20. The adjustable rearview mirror of claim 19, wherein said first centering member and said second centering member are each comprised of O-rings.

\* \* \* \* \*